March 30, 1965     B. DOYLE ETAL     3,175,405
SUPERCONDUCTING APPARATUS
Filed Nov. 24, 1961

*INVENTORS*
BARRETT DOYLE
HENRY W. TEN BROEK

BY Roger W. Jensen
ATTORNEY.

United States Patent Office 3,175,405
Patented Mar. 30, 1965

3,175,405
SUPERCONDUCTING APPARATUS
Barrett Doyle, New Brighton, and Henry W. Ten Broek, Minneapolis, Minn., assignors to Honeywell Inc., a corporation of Delaware
Filed Nov. 24, 1961, Ser. No. 154,623
8 Claims. (Cl. 73—517)

This invention relates to control apparatus, and more particularly to highly accurate control apparatus. The particular embodiment illustrated relates to an acceleration sensor, however, the applicant's teaching is also applicable to other control apparatus, for example, force measuring apparatus, force applying apparatus, and displacement sensing apparatus.

With reference now to the general area of acceleration sensing, a conventional prior art inertial type accelerometer operates as a closed loop servomechanism. Briefly, such a prior art accelerometer comprises a seismic mass element which is supported within a housing element for movement relative to an axis upon acceleration of the housing element. A displacement of the seismic mass element is sensed by a suitable pickoff means, for example an E-type inductive pickoff, which produces a signal indicative of the displacement of the seismic mass element relative to the axis. The signal from the pickoff means is conducted to an electronic amplifier means where the signal is amplified and then conducted to a force generator means. The force generator means applies a force to the seismic mass element tending to rebalance or return the seismic mass element to its null position. The force required to rebalance the seismic mass is proportional to the applied acceleration in accordance with Newton's second law of motion.

Consequently, in order to determine the acceleration, it is necessary to obtain a measurement of the rebalancing force applied to the seismic mass element. It is not possible to obtain a direct measurement of the force applied to the seismic mass element; it is necessary to obtain an indirect measurement. The usual method is to measure the voltage across a resistor in series with the force generator and thereby obtain an indication of the current supplied to the force generator. The force generator is designed such that the force applied to the seismic mass element is proportional to the current supplied. Therefore, by determining the current applied to the force generator it is possible to obtain an indirect indication of the rebalance force applied to the seismic mass. The magnitude of the rebalance force is indicative of the applied acceleration.

As a result, the accuracy of such an accelerometer is limited by the accuracy of the components within the closed loop. The linearity and scale factor stability of the force generator are limiting factors in the accuracy of the prior art accelerometer. In addition, the null stability of the pickoff means is a limiting factor in the accuracy of the prior art accelerometers. Further, distortion of the pickoff signal by the amplifier decreases the accuracy of the instrument. In such a closed loop servomechanism, a small bias introduced into the system would change the relationship between the force applied to the seismic element and the output signals obtained resulting in an erroneous output.

The applicants eliminate the inaccuracies of the prior art accelerometers by utilizing a unique concept which eliminates the need for the external electronics utilized in a normal rebalance, closed loop servomechanism. The applicants accomplish this by utilizing a superconducting seismic mass element in cooperation with superconducting restraint rings in which persistent electric currents flow. The restraint rings function to restrain the seismic mass element by the action of their magnetic fields and to provide a direct measurement of the restraining force applied thereto which is indicative of the applied acceleration. Stated otherwise, the applicants' unique concept as utilized in an accelerometer comprises a superconducting restraint ring and a superconducting seismic mass element. The restraint ring functions to restrain the seismic mass element and provides a signal indicative of the applied acceleration.

It is, therefore, an object of this invention to provide an improved control apparatus.

A further object of the invention is to provide an improved acceleration sensing instrument.

These and other objects of the invention will become apparent from a study of the accompanying specification and claims in conjunction with the single sheet of drawing in which:

Figure 1:
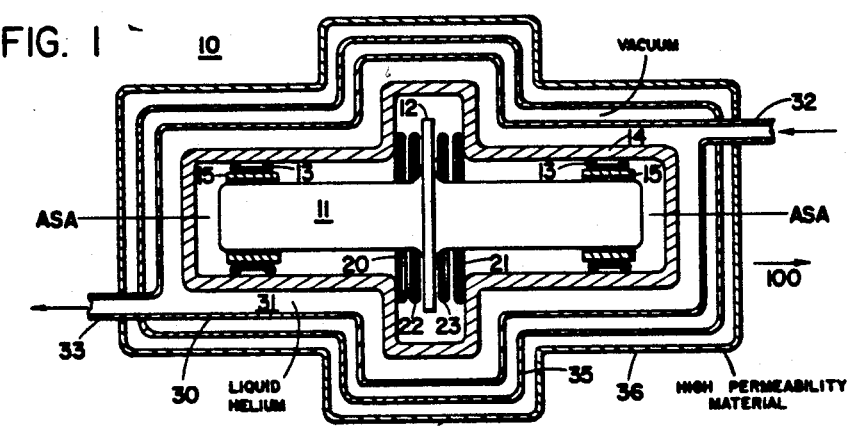
FIGURE 1 is a cross-sectional view of one form of the applicant's unique accelerometer.

Referring now to FIGURE 1, reference numeral 10 depicts one embodiment of the applicant's unique accelerometer. A generally cylindrically shaped superconducting mass element 11 is provided with an enlarged radius section or flange 12 thereon. The flange 12 is positioned equidistant from the ends of the seismic mass member 11. The seismic mass element is positioned within a housing element 14 which surrounds the seismic mass element 11. A plurality of support coils 13 are attached around the periphery of each of two cylindrically shaped sleeve elements 15. One sleeve element 15 is positioned around the periphery of each end of the seismic mass element 11 and is rigidly attached to the housing element by suitable means (not shown). The support coils 13 are also superconducting and cooperate with the superconducting seismic mass element 11 so as to support the seismic mass element for unrestrained displacement along the acceleration sensitive axis, identified by the symbol ASA, in FIGURE 1. The support coils 13 have surface currents induced therein which set up a magnetic flux field around the periphery of seismic mass element 11, thus supporting it without any frictional restraint along the ASA. The actual mechanics of the interaction of the support coils 13 and the seismic mass element 11 will be more fully discussed hereinafter.

Two superconducting restraint rings or coils 20 and 21 having surface currents induced therein are rigidly attached to the housing element 14, by suitable means (not shown). One restraint ring is positioned on each side of the flange 12 of the seismic mass element 11 and contiguous therewith. The restraint coils or rings 20 and 21 are generally ring shaped, and have a diameter slightly less than the outer diameter of flange 12 in the embodiment illustrated. The restraint rings 20 and 21 are fabricated from a material such as lead, niobium, or other superconducting material.

Positioned intermediate the restraint rings 20 and 21 and the flange 12 are two damping rings 22 and 23. The damping rings 22 and 23 are generally ring shaped and are of substantially the same diameter as the restraint rings 20 and 21 in the embodiment illustrated. The damping rings 22 and 23 are not superconducting. The damping rings are fabricated of a material such as copper which is not a superconductor.

The superconducting state of the seismic mass element 11, the support rings 13, and the restraint rings 20 and 21 occurs at temperatures near absolute zero. Actually, the superconducting state occurs below 10° K. for superconducting metals and below 20° K. for superconducting alloys and intermetallics. In order to maintain the superconducting elements of the accelerometer in the desired superconducting state, it is necessary to maintain the temperature thereof near absolute zero. In order to accomplish this, a jacket 30 is provided which completely surrounds the housing element 14. The jacket 30 is filled with liquid helium 31 which has a boiling point temperature of 4.2° K. The liquid helium 31 is constantly circulated through the jacket 30 through ports 32 and 33 which are connected to a suitable cryostat (not shown).

A vacuum envelope 35 surrounds the jacket 30 and provides a vacuum therebetween. The vacuum functions to insulate the liquid helium 31 from the ambient temperature. A jacket 36 made out of a suitable high permeability material such as Mu metal surrounds jacket 35 so as to shield the accelerometer from external magnetic fields.

Means are also provided for sensing the surface currents in the restraint rings or coils 20 and 21 (not shown in FIGURE 1). As illustrated schematically in FIGURE 2, the restraint rings 20 and 21 each encircle a soft magnetic core element (not a superconductor) 40 and 41, respectively. The core elements 40 and 41 each have a wide air gap therein, identified by reference numbers 42 and 43 respectively. A change in magnitude in the magnetic flux appearing in the air gaps 42 and 43 is sensed by suitable means, for example nuclear magnetic resonance (NMR) means. A suitable NMR device is disclosed in application Serial No. 118,704, filed June 21, 1961, and assigned to the same assignee as the patent application. It should be pointed out that although a NMR sensing means is illustrated, and performs excellently due to the extreme sensitivity thereof, other suitable means of sensing the surface currents of the restraint rings may be utilized.

Figure 3:
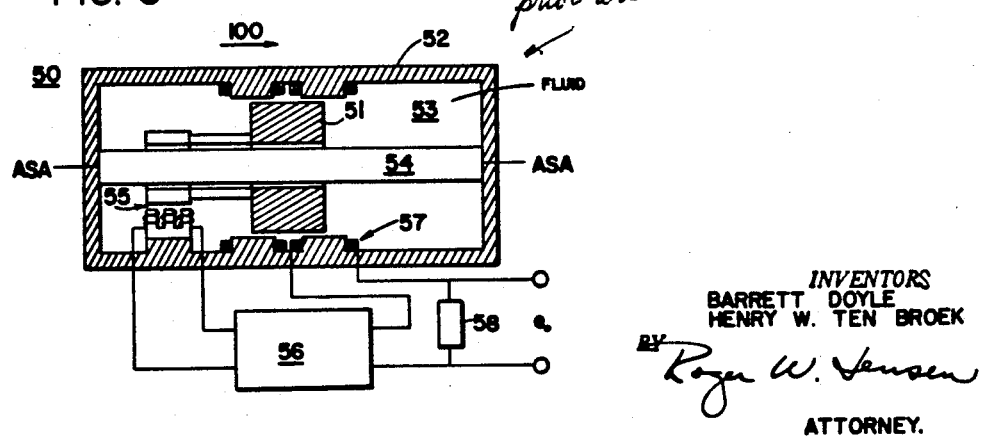
FIGURE 3 is a cross-sectional view of a typical prior art closed loop type of accelerometer.

FIGURE 3 illustrates a typical prior art closed loop type of linear accelerometer which is identified by reference numeral 50. A seismic mass element 51 is positioned within a housing element 52. The housing element 52 is filled with an oil or other fluid 53 so that the seismic mass 51 has neutral buoyancy. A guide rod 54 is provided to restrict the sensitivity of the seismic mass to a single axis. The acceleration sensitive axis coincides with the axis of the guide rod 54 and is indicated by reference letters ASA. An E-type pickoff is provided to sense the displacement of the seismic mass element 51 along the ASA and produce a signal indicative thereof. The signal from the pickoff 55 is conducted to an amplifier 56; the signal from amplifier 56 is conducted to a torque generator 57. A readout resistor 58 is connected in series with the signal generator 57 windings and the output signal $e_o$ is the voltage across resistor 58.

*Operation*

The typical prior art closed loop type accelerometer suitable for use in inertial systems, which is illustrated in FIGURE 3, operates as follows: an applied acceleration along the ASA in the direction of the arrow 100 results in a relative movement between the housing 52 and the seismic mass element 51. As viewed in FIGURE 3, the relative movement would appear as mass 51 being displaced to the left along the ASA. This relative movement is sensed by the E-type pickoff 55 and a voltage is generated indicative of the relative displacement of the seismic mass element 51. The voltage from the pickoff means 55 is conducted to an electronic amplifier 56 where the signal is amplified and conducted to the torque generator 57. Energization of the torque generator 57 results in a rebalance force being applied to the seismic mass element 51 tending to return it to the center position as illustrated in FIGURE 3.

The force required to hold a seismic mass element near a reference position or null position in a housing subjected to an acceleration is proportional to the acceleration of the housing. In prior art accelerometers, it is necessary to utilize an indirect measurement of the force, which is obtained by measuring the voltage $e_o$ across readout resistor 58. The voltage $e_o$ is indicative of the current supplied to torque generator 57. The current is indicative of the rebalance force applied to the seismic mass element 51. Consequently, an indirect measurement of the rebalance force is obtained by measuring the voltage $e_o$ across resistor 58. The magnitude of the rebalance force is indicative of the applied acceleration, so that voltage $e_o$ is indicative of the applied acceleration.

Consequently, the accuracy and stability of such an accelerometer is dependent upon the accuracy and stability of the component parts in the closed loop: pickoff 55, amplifier 56, torque generator 57, and readout resistor 58. As mentioned earlier, this results in a limitation upon the accuracy that may even theoretically be obtained in this type of an instrument. In such an instrument, any variation in the components therein results in a change in the scale factor, or the relationship between force applied and the readout obtained therefrom.

The applicants eliminate the inaccuracies and instabilities of such an accelerometer by utilizing a unique concept which eliminates the need for the rebalancing, closed type loop servomechanism. The applicants accomplish this by utilizing a superconducting seismic mass element in cooperation with a superconducting restraint ring. The restraint ring functions to restrain the seismic mass element and to provide a signal indicative of the applied acceleration. It should be noted that the restraint ring does not apply a rebalancing force to the seismic mass in the normal sense of a closed loop servomechanism. Rather, the restraint ring restrains the seismic mass element and at the same time provides a signal indicative of the applied acceleration without the need of a closed loop system.

In order to better understand the operation of the applicants' unique accelerometer, it is necessary to review the phenomenon of superconductivity. The superconducting state which occurs at temperatures near absolute zero, is characterized by the complete loss of electrical resistance and the complete expulsion of magnetic fields from the interior of the superconducts (the Meissner effect). The Meissner effect is considered a more fundamental property than the zero resistance because consideration of a superconductor as a body with infinite conductivity does not lead to a prediction of the Meissner effect, while consideration of a superconductor as a perfect diamagnet (a body having zero permeability) does lead to the prediction of zero resistance. In order that the field inside the superconductor be zero, all currents must flow as surface currents. For a superconductor immersed in a magnetic field, $H_e \neq 0$, surface currents are induced in such a way as to make $B=0$ in the interior.

To understand how the properties of a superconductor can be used, consider a member such as a ring and a member such as a plate, both of which are in the superconducting state, and bring them into a magnetic field, $H_e \neq 0$. In this process, surface currents are built up on both the ring and the plate. The surface currents shield the interiors of the bodies from the magnetic field (that is keep $B=0$). The ring member differs essentially from the plate member in that with proper orientation of the magnetic field, it is possible to induce a total current around the ring in the sense that a closed path can be drawn circling the ring (but nowhere passing through it) which encloses a net flow of current. If a ring has a mean radius R, a circular cross section of radius $r$ where $r \ll R$, and $B_e$ is the value of the magnetic field perpendicular to the plane of the ring, the total magnetic flux encircled by the ring is $\phi = \pi R^2 B_e$, provided that no current flows in the ring. A ring of superconductor material, having an encircled flux $\phi$, which is not in the superconducting state when sufficiently cooled to become superconducting will maintain the encircled flux $\phi$ constant. When $B_e$ is removed, an induced persistent or surface total current then exists, the magnitude of which is given by $$I = \frac{\pi R^2 B_e}{L}$$

where L is the self-inductance of the ring, which will flow undiminished as long as the ring remains superconducting. If the ring is driven into the normal (nonsuperconducting) state, the induced currents are destroyed because the resistance becomes some finite value (resistance>0). This persistent current is induced in such a way as to conserve flux through the hollow of the ring. Thus the ring is analogous to a permanent magnet with a nonvarying total flux, $\phi, \phi = Li =$ constant.

If the ring, with the persistent currents induced therein, is brought toward the plate element with the plane of the ring parallel to the plane of the plate, the magnetic flux through the ring cannot enter the superconducting plate. The result is a repulsive force between the ring and the plate. The simplest way to understand the repulsion is to think of the plate as a superconducting mirror, that is, the plate acts as if an "image" ring is positioned within the plate exactly the same distance from the surface of the plate as the actual ring. However, the current in the "image" ring flows in a direction opposite to the direction of the persistent current in the actual ring. Thus a system analogous to the positioning of two permanent magnets with like poles contiguous has been created. Movement of the ring toward the plate increases the repulsive force.

Relating the above-discussed phenomenon of superconductivity to the embodiment shown in the drawing, let the ring element be replaced by restraint ring 20 and the plate member replaced by the flange 12 of seismic mass element 11. Acceleration of the accelerometer 10 in a direction of the arrow 100 as illustrated in FIGURE 1, will result in a relative movement between the seismic mass 11 and restraint ring 20 which is attached to housing element 14. As viewed in FIGURE 1, the relative movement of the seismic mass element 11 and flange 12 will be toward the left along the ASA. As the superconducting flange 12 approaches the superconducting restraint ring 20, the flux or magnetic field of restraint ring 20 cannot enter the superconducting flange 12. Consequently, a repulsive force F is set up therebetween as hereinbefore explained. The magnitude of the force being given by the formula, $$F = \frac{\phi^2}{2\mu.Rx \ln^2 \left(\frac{2x}{r}\right)}$$

where $\phi =$ flux within the restraint ring 20; $\mu =$ permeability of a vacuum; $R =$ mean radius of restraint ring 20; $r =$ radius of cross section of restraint ring 20; and $x =$ distance between flange 12 and restraint ring 20.

Thus the seismic mass 11 is restrained through the interaction of the restraint ring 20 and the flange 12 so as to restrict the movement thereof. The force applied to the seismic mass element 11 by the restraint ring 20 is equal and opposite to the force resulting from the acceleration of the accelerometer 10. Measurement of this restraint force thus gives a direct reading of the applied acceleration. The ulitization of the applicants' unique approach to measuring acceleration allows this force to be measured directly and thus obtain a direct indication of the applied acceleration.

To explain further, it was previously stated that the persistent current in the restraint ring 20 is induced in such a way as to conserve flux through the hollow of the ring ($\phi =$ constant). The movement of the seismic mass element 11 toward restraint ring 20 in response to the acceleration 100 results in a change in the total inductance of the restraint ring. Since the total flux remains constant, the current $i$ must change accordingly. As pointed out earlier, as the distance between the restraint ring 20 and the flange 12 is decreased, the force acting therebetween is increased. The change in current in the restraint ring 20 is directly related to the force change. Consequently, the restraint ring 20 provides a means of directly measuring the acceleration of the accelerometer 10 and at the same time provides a restraint force on the seismic mass element 11.

Figure 2:
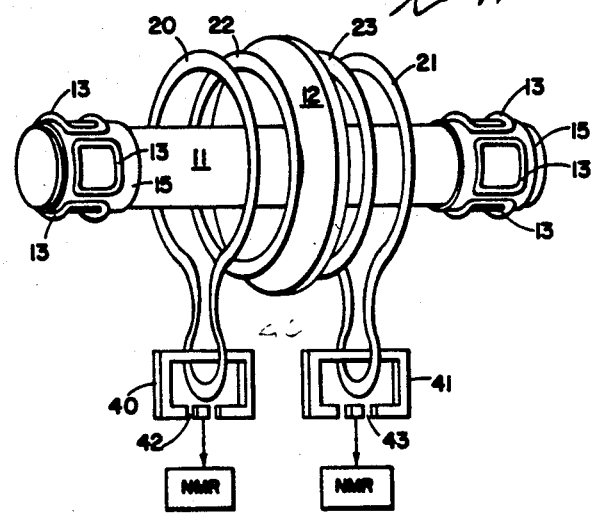
FIGURE 2 is a schematic representation of the accelerometer of FIGURE 1 illustrating the restraint rings in greater detail.

One method of sensing the change in the persistent or surface current in the restraint ring 20 is illustrated in FIGURE 2. A soft magnetic core member 40 is provided with a wide air gap 42 therein. The change in surface currents in restraint ring 20 results in a change in magnetic flux in the air gap 42. A means of sensing this change in flux within the air gap 42, such as a nuclear magnetic resonance (NMR) device, is utilized to provide an indication of the change of surface currents in the restraint ring 20.

The plurality of support coils 13 which are mounted upon sleeve 15 react with the superconducting seismic mass element 11 so as to create a repulsive force therebetween in the manner above discussed. Therefore, the seismic mass 11 is supported concentric with the support coils 13 and sleeve member 15 by the magnetic flux. There is no mechanical contact between the sleeve 15 and coils 13 and the seismic mass element 11. Consequently, the seismic mass 11 is supported for unrestrained movement along the ASA. It should be pointed out that there are a number of possible geometric configurations of support coils which may be utilized to obtain the required support.

Damping coils 22 and 23, which are not superconducting, are provided to absorb the energy of acceleration since there is no damping in the operation of the restraint rings 20 and 21. The energy of acceleration is converted to induced currents flowing around the damping rings 22 and 23. Current is induced in the damping rings since there is a change in the flux density in the area between the restraint rings 20 and 21 and the flange 12 upon relative movement therebetween. Since the damping rings 22 and 23 are not superconducting, they have a finite resistance and the energy of acceleration is dissipated as heat in the damping rings.

While the particular embodiment illustrated relates to an acceleration sensor, it should be pointed out that the applicants' teaching of the utilization of a superconducting element supported for movement relative to an axis and a superconducting restraint ring is applicable to other control apparatus. For example, it may be utilized to produce a rebalance force upon a gyroscope or it may be utilized to sense the displacement of an element, or it may be utilized in a force measuring apparatus.

Consequently, while we have shown and described the specific embodiment of this invention, further modifications and improvements will occur to those skilled in the art. We desire it to be understood, therefore, that this invention is not limited to the particular form shown, and we intend that the appended claims cover all modifications which do not depart from the spirit of the scope of this invention.

We claim:

1. In an accelerometer: a housing element having an acceleration sensitive axis; a super-conducting seismic mass element having a flange thereon substantially perpendicular to said axis; a plurality of superconducting support coils mounted upon said housing element contiguous said seismic mass, said support coils supporting said seismic mass element within said housing element for movement along said axis relative to said housing upon acceleration of the accelerometer; a plurality of superconducting restraint rings having surface currents therein mounted within said housing element, said restraint rings being substantially perpendicular to said axis and contiguous opposite sides of said flange; means for sensing the surface currents in said restraint rings, said restraint rings functioning to restrain said seismic mass element so as to restrict the movement thereof along said axis relative to said housing and to provide a signal indicative of the applied acceleration; damping coils mounted upon said housing element intermediate said flange and said restraint rings, said damping coils damping the movements of said seismic mass element; and means shielding the accelerometer from external magnetic fields.

2. In an accelerometer: a housing element having an acceleration sensitive axis; a super-conducting seismic mass element having a flange thereon substantially perpendicular to said axis; a plurality of superconducting support coils mounted upon said housing element, said support coils supporting said seismic mass element within said housing element for movement relative to said axis upon acceleration of the accelerometer; a superconducting restraint coil having surface currents therein positioned on each side of said flange and substantially parallel thereto, said restraint coil being mounted upon said housing element; means for sensing the surface currents in said restraint coil, said restraint coil functioning to restrain said seismic mass element so as to limit the movement thereof and to provide a signal indicative of the applied acceleration; and damping coils mounted upon said housing element intermediate said flange and said restraint coil for damping the movements of said seismic mass element.

3. In an accelerometer: a housing element; a superconducting seismic mass element; a plurality of superconducting support coils monted upon said housing element, said support coils supporting said seismic mass element within said housing element for movement relative to an acceleration sensitive axis upon acceleration of the accelerometer; a plurality of superconducting restraint coils having surface currents therein mounted upon said housing element along said axis and contiguous said seismic mass element; means for sensing the surface currents in said restraint coils, said restraint coils functioning to restrain said seismic mass element and to provide a signal indicative of the applied acceleration; and damping coils mounted upon said housing element along said axis for damping the movements of said seismic mass element.

4. In an accelerometer: a housing element; a superconducting seismic mass element; means for supporting said seismic mass element within said housing element for movement relative to an acceleration sensitive axis upon acceleration of the accelerometer; a superconducting restraint ring having surface currents therein, said restraint ring being rigidly attached to said housing element along said axis and contiguous said seismic mass; means for sensing said surface currents, said restraint ring functioning to restrain said seismic mass element along said axis and to provide a signal indicative of the applied acceleration.

5. In an accelerometer: a housing element; a superconducting seismic mass element; a plurality of superconducting coils supporting said seismic mass element within said housing element for movement relative to an axis upon acceleration of the accelerometer; a plurality of superconducting restraint rings having surface currents therein, said restraint rings being rigidly attached to said housing element along said axis and contiguous said seismic mass element; means for sensing the magnitude of said surface currents; and coil means attached to said housing along said axis contiguous said seismic mass element, said coil means being operable to damp the movement of said seismic mass element relative to said axis.

6. In an accelerometer: a housing element; a superconducting seismic mass element; means for magnetically supporting said seismic mass element within said housing element for movement relative to an axis upon acceleration of the accelerometer; a superconducting restraint ring having surface currents therein, said restraint ring being fixed relative to said housing element and positioned along said axis contiguous said seismic mass element; means for sensing the magnitude of said surface currents; and means for damping the movement of said seismic mass element relative to said housing.

7. In an accelerometer: a housing element; a superconducting seismic mass element; means for supporting said seismic mass element within said housing element for movement relative to an axis upon acceleration of the accelerometer including a superconducting restraint ring having surface currents therein, said restraint ring being rigidly attached to said housing element and positioned along said axis contiguous said seismic mass element; and means for sensing the magnitude of said surface currents.

8. In an accelerometer comprising a housing element and a superconducting seismic mass element mounted within said housing element for displacement relative to an axis upon acceleration of the accelerometer, in combination with displacement sensing means comprising a superconducting restraint ring having surface currents therein, said restraint ring being mounted upon said housing element along said axis and contiguous said seismic mass element, relative movement between said seismic mass element and said restraint ring resulting in a change in said surface currents which is indicative of a displacement of said seismic mass element; and means for sensing the change in said surface currents.

References Cited by the Examiner

UNITED STATES PATENTS

| | | | |
|---|---|---|---|
| 2,919,583 | 1/60 | Parker | 73—504 |
| 2,966,802 | 1/61 | Steen | 73—516 |
| 3,026,151 | 3/62 | Buchhold | 308—10 |
| 3,044,309 | 7/62 | Buchhold | 74—5 |

OTHER REFERENCES

A text, "Superconductivity," by Von Laue, pp. 70–71, published by Academic Press Inc., New York, 1952.

RICHARD C. QUEISSER, *Primary Examiner.*

J. E. WEST, JAMES J. GILL, *Examiners.*